(12) United States Patent
Chen

(10) Patent No.: US 8,983,481 B2
(45) Date of Patent: Mar. 17, 2015

(54) APPARATUSES AND METHODS FOR MEASUREMENT REPORTING IN A WIRELESS COMMUNICATIONS SYSTEM

(75) Inventor: Te-Ming Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 1030 days.

(21) Appl. No.: 13/069,113

(22) Filed: Mar. 22, 2011

(65) Prior Publication Data

US 2011/0237269 A1 Sep. 29, 2011

Related U.S. Application Data

(60) Provisional application No. 61/316,975, filed on Mar. 24, 2010.

(51) Int. Cl.
| | |
|---|---|
| *H04W 72/00* | (2009.01) |
| *H04W 24/10* | (2009.01) |
| *H04W 36/00* | (2009.01) |
| H04W 36/14 | (2009.01) |
| H04W 48/08 | (2009.01) |
| H04W 84/04 | (2009.01) |

(52) U.S. Cl.
CPC .......... *H04W 24/10* (2013.01); *H04W 36/0088* (2013.01); *H04W 36/14* (2013.01); *H04W 48/08* (2013.01); *H04W 84/045* (2013.01)
USPC ......... 455/450; 455/422.1; 455/423; 455/418

(58) Field of Classification Search
CPC ...... H04W 72/04; H04W 76/02; H04W 16/10
USPC ............... 455/450, 422.1, 423, 425
See application file for complete search history.

(56) References Cited

U.S. PATENT DOCUMENTS

| | | | |
|---|---|---|---|
| 8,270,369 B1 * | 9/2012 | Chang | 370/331 |
| 8,615,231 B2 * | 12/2013 | Demarez et al. | 455/432.2 |
| 2009/0191862 A1 | 7/2009 | Amirijoo et al. | |

FOREIGN PATENT DOCUMENTS

| | | |
|---|---|---|
| KR | 10-2010-0092043 A | 8/2010 |
| WO | WO 2008/134281 A2 | 11/2008 |

(Continued)

OTHER PUBLICATIONS

3GPP TSG-RAN WG2#61 meeting R2-080892; Published Feb. 11, 2008; 12 pages.

(Continued)

*Primary Examiner* — Nghi H Ly
(74) *Attorney, Agent, or Firm* — Birch, Stewart, Kolasch & Birch, LLP

(57) ABSTRACT

A mobile communications device with a wireless module and a controller module is provided. The wireless module performs wireless transceiving to and from a first cellular station of a first service network and a second cellular station of a second service network, wherein the first service network is a long term evolution (LTE) network and the second service network is a Universal Mobile Telecommunications System (UMTS) network. The controller module receives a measurement request message from the first cellular station via the wireless module, performs a measurement on the second cellular station in response to the measurement request message and reports the measurement result to the first service network via the wireless module, wherein the second cellular station is previously not requested or configured by the first service network to be measured.

16 Claims, 5 Drawing Sheets

(56) References Cited

FOREIGN PATENT DOCUMENTS

| WO | WO 2009/022976 A1 | 2/2009 |
|---|---|---|
| WO | WO 2009/043002 A2 | 4/2009 |
| WO | WO 2009/115897 A1 | 9/2009 |
| WO | WO 2009/117658 A1 | 9/2009 |
| WO | WO 2009/120127 A1 | 10/2009 |
| WO | WO 2009/140310 A1 | 11/2009 |

OTHER PUBLICATIONS

3GPP TS 36.331 V8.0.0 (Dec. 2007); 3rd Generation Partnership Project; Technical Specification Group Radio Access Network; Evolved Universal Terrestrial Radio Access (E-UTRA); Radio Resource Control (RRC); Protocol specification (Release 8); pp. 1-56.

3GPP TS 36.331 V9.1.0 (Dec. 2009); 3rd Generation Partnership Project; Technical Specification Group Radio Access Network; Evolved Universal Terrestrial Radio Access (E-UTRA); Radio Resource Control (RRC); Protocol specification (Release 9); pp. 1-233.

Femtocell Wireless Communications; Femtocell Access Control Strategy in UMTS and LTE; Assen Golaup et al., Vodafone Group; IEEE Communications Magazine Sep. 2009; pp. 117-123.

3GPP TS 36.331 v8.1.0 (Mar. 2008); 3rd Generation Partnership Project; Technical Specification Group Radio Access Network; Evolved Universal Terrestrial Radio Access (E-UTRA) Radio Resource Control (RRC); Protocol specification (Release 8); pp. 1-122.

ETSI TS 136 331 v9.1.0 (Feb. 2010); LTE; Evolved Universal Terrestrial Radio Access (E-UTRA); Radio Resource Control (RRC); Protocol specification (3GPP TS 36.331 version 9.1.0 Release 9); pp. 1-235.

* cited by examiner

APPARATUSES AND METHODS FOR MEASUREMENT REPORTING IN A WIRELESS COMMUNICATIONS SYSTEM

CROSS REFERENCE TO RELATED APPLICATIONS

This Application claims priority of U.S. Provisional Application No. 61/316,975, filed on Mar. 24, 2010, and the entirety of which is incorporated by reference herein.

BACKGROUND OF THE INVENTION

1. Field of the Invention

The invention generally relates to measurement reporting in a wireless communications system, and more particularly, to apparatuses and methods for measurement reporting in a wireless communications system associated with different Radio Access Technologies (RATs).

2. Description of the Related Art

In a typical mobile communications environment, a user equipment (UE) may communicate voice and/or data signals with one or more service networks via cellular stations of the service networks. The wireless communications between the UE and the service networks may be in compliance with various radio access technologies (RATs), such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Universal Mobile Telecommunications System (UMTS) technology and others.

To enable certain functionalities for UEs, such as handover (HO) between network nodes, it may be necessary for the UE to perform measurements, for example, of cells (i.e. the cellular stations) on a certain frequency or systems. To perform these measurements, the UE may require a measurement configuration for the purpose of performing measurements in the same or other frequencies and other radio access technologies (RATs). The service network (i.e. E-UTRAN in LTE) can configure the UE to report measurement information to support the control of UE mobility. The measurement configurations can be signaled via the RRCConnectionReconfiguration message. Measurement configurations may include a number of measurement types, such as inter-frequency measurements, intra-frequency measurements, and inter-RAT measurements which may assist the service network for handover (HO) purposes. For both the UMTS and LTE technologies, these measurement types are configured by the service network, and the UE may report measurement information on a certain frequency or RAT, if the UE is configured with such events. The measurement configurations may at least comprise measurement objects which are the objects on which the UE shall perform the measurements. The measurement procedures distinguish the following types of cells: the Serving cell, Listed cells and Detected cells, wherein the Serving cell is the cell that the UE has camped on, the Listed cells are cells listed within the measurement object(s) and the Detected cells are cells that are not listed within the measurement object(s) but are detected by the UE on the carrier frequency(ies) indicated by the measurement object(s).

Particularly, in the design of current service networks, a home cell, such as a Closed Subscriber Group (CSG) cell, a hybrid cell, a femtocell, a picocell or other home cell can use a small coverage cellular base station, called Home Node-B (HNB), or Home e-Node-B (HeNB); which is typically designed for use in residential or small business environments. The home cell connects to a service provider network via a wired or wireless backhaul connection. For example, home cells (e.g. CSG cells or hybrid cells) or the HNBs or HeNBs are used for deployment in school campuses or are used for deployment in users' homes. When being configured to operate in an open access mode, the HNB or HeNB may provide service access to subscribers of any service network (subject to the roaming agreement reached therebetween). Specially, the HNB or HeNB may be associated with a CSG and may only provide service access to the subscribers belonging to the associated CSG when operating in a closed access mode.

Conventionally, for inter-RAT Universal Terrestrial Radio Access (UTRA) technology measurements, the UE measures and reports on listed cells which are cells listed within the measurement object(s) to be measured. Note that the current working assumption in the 3GPP specification is that the CSG cells of a home deployment types are not indicated within the neighboring cell list.

BRIEF SUMMARY OF THE INVENTION

Accordingly, embodiments of the invention provide apparatuses and methods for measurement reporting in a wireless communications system associated with different Radio Access Technologies (RATs). In one aspect of the invention, a mobile communications device with a wireless module and a controller module is provided. The wireless module performs wireless transceiving to and from a first cellular station of a first service network and a second cellular station of a second service network, wherein the first service network is a long term evolution (LTE) network and the second service network is a Universal Mobile Telecommunications System (UMTS) network. The controller module receives a measurement request message from the first cellular station via the wireless module, performs a measurement on the second cellular station in response to the measurement request message and reports the measurement result to the first service network via the wireless module, wherein the second cellular station is previously not requested or configured by the first service network to be measured.

In another aspect of the invention, a method for measurement reporting in a mobile communications device is provided. The method comprises the steps of receiving a measurement request message from a first cellular station of a first service network, performing a measurement on a second cellular station of a second service network in response to the measurement request message, and reporting the measurement result to the first service network, wherein the first service network is a long term evolution (LTE) network and the second service network is a Universal Mobile Telecommunications System (UMTS) network, and the second cellular station is previously not requested or configured by the first service network to be measured.

In yet another aspect of the invention, a service network with a cellular station and a control node is provided. The cellular station performs wireless transceiving to and from a mobile communications device. The control node adds a Closed Subscriber Group (CSG) cellular station of a home deployment type to a neighboring cell list and transmits a measurement request message with the neighboring cell list to the mobile communications device via the cellular station.

Other aspects and features of the present invention will become apparent to those with ordinarily skill in the art upon review of the following descriptions of specific embodiments of apparatuses and methods for measuring reporting in a wireless communications system.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
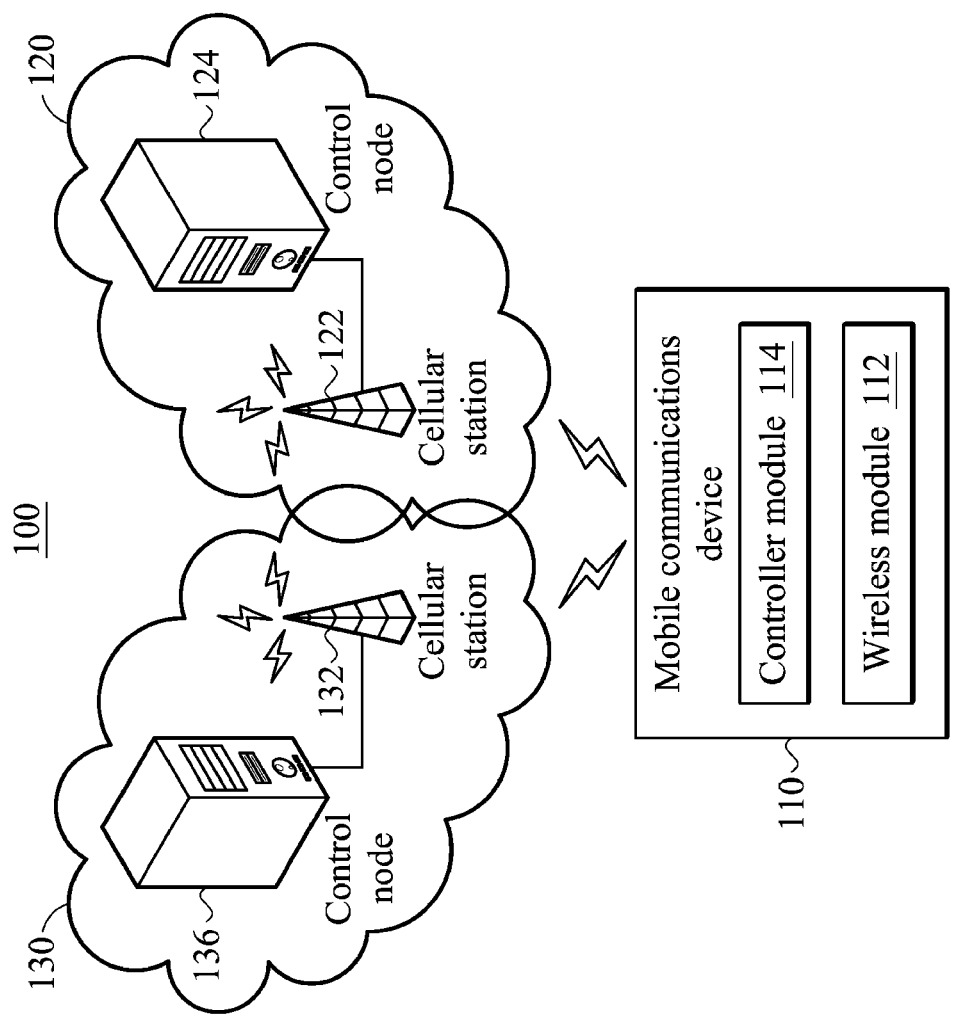
FIG. 1 is a block diagram illustrating a mobile communications environment according to an embodiment of the invention

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

A WCDMA network or an LTE network may comprise femtocells or Closed Subscriber Group (CSG) cells which are commonly designed for residential or small business environments, and can provide wireless coverage to UEs using the WCDMA technology or LTE technology to communicate with the UEs and an existing broadband Internet connection (e.g., digital subscriber line (DSL), cable, etc.) for backhaul. As previously described, the service network may configure the UE to report measurement information to support the control of UE mobility. The UE is also responsible to report measurement information to the evolved-Node Bs (eNBs). The service network (EUTRAN) may provide the measurement configuration applicable for a UE by means of dedicated signaling, i.e. using an RRC message (for example, an RRC-ConnectionReconfiguration message). In one embodiment, the measurement configuration (MeasConfig) may include the following parameters:

1. Measurement objects (measObject): The objects on which the UE shall perform the measurements, such as a carrier frequency. The measurement object may include a list of cells to be considered (white-list or black-list) as well as associated parameters, e.g. frequency- or cell-specific offsets.

2. Reporting configurations (reportConfig): A list of reporting configurations, where each reporting configuration may consist of the (periodic or event-triggered) criteria which cause the UE to send a measurement report, as well as the details of what information the UE is expected to report on (e.g. the quantities, such as Received Signal Code Power (RSCP) for the UMTS or Reference Signal Received Power (RSRP) for the LTE, and the number of cells).

3. Measurement identities (measId): A list of measurement identities where each measurement identity links one measurement object with one reporting configuration.

4. Quantity configurations (quantityConfig): The quantity configuration defines the measurement quantities and associated filtering used for all event evaluations and the related reporting of the measurement type.

5. Measurement gaps (measGapConfig): Periods that the UE may use to perform measurements, i.e. no (UL, DL) transmissions are scheduled.

Generally, the service network only configures a single measurement object for a given frequency. Based on the measurement configuration(s) provided by the service network, the UE may perform a measurement task for the corresponding measurement object(s), and report the measurement result according to the reporting configuration(s).

Note that during the conventional inter-RAT UTRA measurement reporting procedure described above, the UE can only measure and report listed UTRA cells while the UE was served by an LTE cell. Moreover, the service network cannot include CSG cells of a home deployment type as the neighboring cells information in the measurement object.

After receiving the proximity indication message from a UE, a service network may setup the measurement configurations of the CSG cells for the UE. In the measurement configuration message, the service network cannot include any CSG cells of a home deployment type in the neighboring cell list. After receiving such measurement configurations from the service network, the UE can only measure and report on the detected CSG cells of a home deployment type.

The proximity indication message is used to resolve the Physical Cell Identity (PCI) confusion issue, which is caused by two cells in the vicinity of each other using the same PCI, so as to avoid ambiguities in the measurement reports. Since the PCI configuration in the LTE or primary scrambling code (PSC) confusion in the UMTS only occurs in the CSG cells of a home deployment type, the UE cannot report on the CSG cells of a home deployment type after it sends the proximity indication message.

In order to solve these problems, the invention provides improved measurement reporting procedures for the UE while the UE is in an LTE cell and for the service network.

FIG. 1 is a block diagram illustrating a mobile communications environment according to an embodiment of the invention. In the mobile communications environment 110, the mobile communications device 110 is wirelessly connected to the cellular station 122 of the service network 120 and the cellular station 132 of the service network 130 for obtaining wireless services. Generally, the cellular station 122 may be referred to as a base station, a cell or an access station, or may be referred to as an Home Node-B (HNB) in a WCDMA network or a Home e-Node-B (HeNB) in an LTE network, which is controlled by the control node 124 to provide the functionality of wireless transceiving for the service network 120. Similarly, the cellular station 132 may be referred to as a base station, a cell or an access station, or may be referred to as an HNB in a WCDMA network or a HeNB in an LTE network, which is controlled by the control node 134 to provide the functionality of wireless transceiving for the service network 130.

In this embodiment, the cellular station 122 is an LTE cellular station (or called an LTE cell) which supports the LTE technology and the cellular station 132 is a UTRA cellular station (or called a UTRA cell) which supports the UTRA technology. The mobile communications device 110 is referred to as a user equipment (UE) or a mobile station (MS), supporting the abovementioned RATs, and can be a device such as a mobile phone, a computer system, etc. The mobile communications device 110 comprises a wireless module 112 for performing the functionality of wireless transmissions and receptions to and from the cellular station 122 or the cellular station 132. To further clarify, the wireless module 112 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communications device 110 further comprises a controller module 114 for controlling the operation of the wireless module 112 and other functional components, such as a display unit and/or keypad serving as the MMI (man-machine interface), a storage unit storing the program codes of applications or communication protocols, or others. In one embodiment, the service network 120 may be a WCDMA network and the mobile communications device 110 may be a UE in compliance with the 24.008 specification and other related specifications of the WCDMA technology. In another embodiment, the service network 130 may be an LTE network and the mobile communications device 110 may be a UE in compliance with the 3GPP TS 24.301 specification and other related specifications of the LTE technology. Alternatively, the mobile communications device 110 may be a UE in compliance with both of the specifications of the WCDMA and LTE communication protocols, and the invention is not limited thereto.

To be more specific, the controller module 114 controls the wireless module 112 for performing a measurement reporting procedure with the service network 120 and/or the service network 130 via the cellular station 122 and/or the cellular station 132, respectively.

Figure 2:
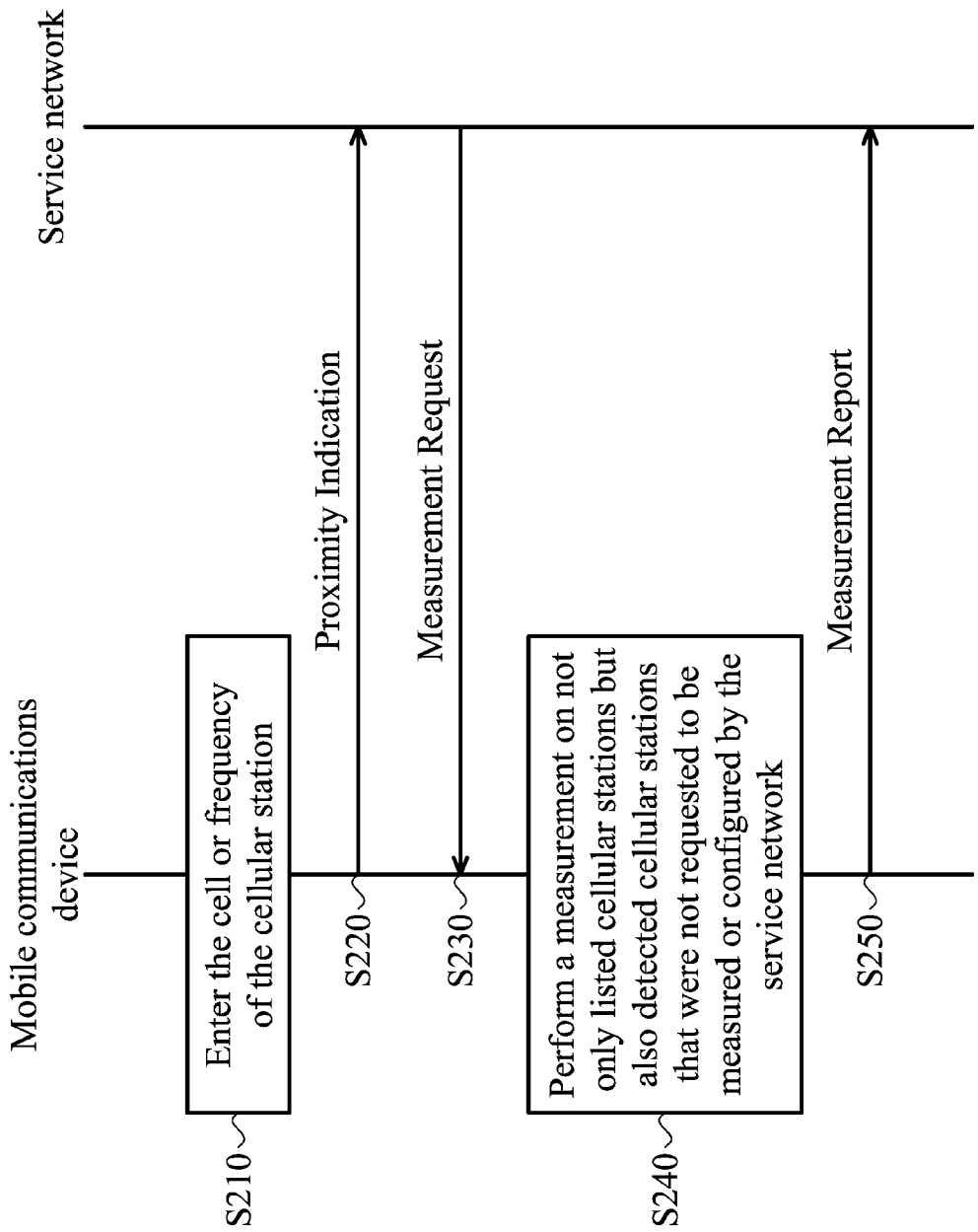
FIG. 2 is a message sequence chart illustrating a measurement reporting procedure from a mobile communications device to an LTE cellular station according to an embodiment of the invention.

FIG. 2 is a message sequence chart illustrating a measurement reporting procedure from a mobile communications device to an LTE cellular station according to an embodiment of the invention. Initially, when entering the cell or frequency of the cellular station 122 (e.g. an HNB) (step S210), the controller module 114 may transmit a proximity indication to the service network 120 via the wireless module 112 (step S220). Specifically, the detection of nearness to the cellular station 122 may be performed according to a finger print list which is stored in the mobile communications device 110 for maintaining the finger print of the CSG cellular stations the mobile communications device 110 has visited before, such as the cell identities of the neighboring cellular stations. For example, the mobile communications device 110 may transmit a proximity indication to the service network 120 when the mobile communications device 110 detects that at least one of the HNBs with a CSG ID stored in its CSG white list may potentially be using a same of different frequency or different RAT than the serving cell and is close to its current location (in the proximity of the serving cell). When receiving the proximity indication, the service network 120 may transmit a measurement request to the mobile communications device 110 (step S230), which includes a list of cell identities of cellular stations to be measured and requests a measurement to be performed on the listed cellular stations. Accordingly, when receiving the measurement request, the controller module 114 prepares to perform a measurement on the listed cellular stations. Meanwhile, the mobile communications device 110 may further find that some cellular stations 132 of the service network 130 (e.g. UMTS cells), which are not listed cellular stations within the measurement object(s) in the measurement request message but can be detected on the carrier frequency(ies) indicated by the measurement object(s), exist. Specifically, the cellular stations 132 of the service network 130 may be referred to as detected cellular stations. For example, the service network 120 may request a measurement to be performed on the cellular stations 1, 2 of the service network 120 on a specific carrier frequency. However, the mobile communications device 110 may find that cellular stations a, b of the service network 130 which have not been requested to be measured or configured by the service network 120 has been detected on the same specific carrier frequency. In this case, the cellular stations a, b of the service network 130 can be referred to as detected cellular stations and will also be measured by the mobile communications device 110. In some embodiments, the detected cellular stations are CSG cellular stations. Particularly, the CSG cellular stations are home deployment types. For example, the aforementioned CSG cellular stations are the CSG cellular stations included in the CSG white list of the mobile communications device 110.

In one embodiment, the aforementioned detected cellular stations may be cellular stations that the mobile communications device 110 has visited before, e.g., for example, but not limited to, the prior serving cell of mobile communications device 110, the cellular stations that the mobile communications device 110 has camped on before, the cellular stations that the mobile communications device 110 has measured before, the cellular stations that the mobile communications device 110 has been configured to be measured before, the cellular stations stored in the Universal Subscriber Identity Module (USIM) of mobile communications device 110 and the cellular stations stored in the finger print list of mobile communications device 110. In another embodiment, the aforementioned detected cellular stations may be cellular stations that are already stored in memory of the mobile communications device 110, e.g., for example, but not limited to, cellular stations which were previously configured by the service network 120, and never found, cellular stations that are stored in the USIM of the mobile communications device 110, and cellular stations that are stored in the software or hardware of the mobile communications device 110. In another embodiment, the aforementioned cellular stations may be cellular stations that were manually inputted by a user of the mobile communications device 110, e.g. a specific cellular station that the user has inputted and requested to search for.

Therefore, the mobile communications device 110 performs a measurement on not only the listed cellular stations but also the detected cellular stations 132 of the service network 130 (e.g. URTA cells) which may not be listed cellular stations within the measurement object(s) in the measurement request message but can be detected on the carrier frequency(ies) indicated by the measurement object(s) via the wireless module 112 (step S240). In this step, the mobile communications device 110 may measure and report on not only the UTRA cells that have been requested or configured to be measured by the service network 120 but also the UTRA cells that were not requested to be measured or configured by the service network 120 (e.g. the Detected UTRA cells). After the measurement is finished, the controller module 112 further reports the measurement result to the service network 120 by transmitting a specific message via the wireless module 112 (step S250). In this embodiment, the specific message is the measurement report message. Namely, the mobile communications device 110 may include the measurement information related to the aforementioned detected cellular stations as part of the measurement results and report the measurement result to the service network 120 by transmitting the measurement report message via the wireless module 112. Then, the service network 120 may further determine whether to hand over the mobile communications device 110 from it's currently camped on cellular station to other cellular stations according to the measurement result. In this way, the mobile communications device 110 may measure and report on not only the UTRA cells that have been requested or configured to be measured by the service network 120 but also the UTRA cells that have not been requested to be measured or configured by the service network 120 so that the service network may perform handover between the listed and detected cells.

In some embodiments, after receiving the specific message (e.g. the measurement report message), the service network 120 may retrieve the measurement results from the specific message and find that there are measurement information related to some cellular stations which are not being requested to be measured for the mobile communications device 110, so the service network 120 may further ask the mobile communications device 110 to report additional information that is related to those cellular stations. For example, the service network 120 may ask the mobile communications device 110 to report additional information that is related to the aforementioned detected cellular stations by transmitting a specific message to the mobile communications device 110. This specific message for the service network 120 asking the mobile communications device 110 to report on additional information may be, e.g., the RRC connection reconfiguration message. The additional information that is related to the aforementioned detected cellular stations may comprise, for example, but not limited to, the CSG information, Cell Global Identity (CGI) information and/or the cell identity of each of the detected cellular stations. The CSG information may be information comprising a CSG identity and/or an indication of whether the mobile communications device 110 is a CSG member. In some embodiments, the additional information may be system information of the aforementioned detected cellular stations that the mobile communications device 110 has already received before. Optionally, as part of the report, additional information may be reported to the service network 120 (if available to the mobile communications device 110), including, for example, but not limited to, one, or a combination of, the known frequency of the HNB(s) which triggered the proximity report and ? CSG stored on the white list of the mobile communications device 110, and/or the known RAT of the CSG cellular station(s) which triggered the report (e.g., LTE or UMTS).

Upon reception of the specific message requesting for reporting of additional information related to the aforementioned detected cellular stations via the wireless module 112, the controller module 114 may obtain requested additional information related to the aforementioned detected cellular stations in response to the specific message and then report on the additional information to the service network 120 via the wireless module 112 by transmitting a specific reporting response message to the service network 120. The specific reporting response message may be, for example, but not limited to, the proximity indication, the RRC connection reconfiguration configuration complete message if a RRC connection reconfiguration configuration message has been received from the service network 120, or a dedicated message only for reporting on the CSG information (e.g. a dedicated CSGInformationReport massage).

In some embodiments, it is also possible for the service network 120 to request or configure the mobile communications device 110 to perform a measurement on the detected cellular stations if such a measurement is allowed. For example, in one embodiment, the service network 120 may request or configure the mobile communications device 110 to perform a measurement on the detected cellular stations by listing the cellular stations in the neighboring cell list in the measurement object(s). In another embodiment, the service network 120 may request or configure the mobile communications device 110 to perform a measurement on the detected cellular stations by transmitting a specific request message to the mobile communications device 110. The specific request message may be, for example, system information and/or the RRC connection reconfiguration message.

According to another embodiment of the invention, to solve the problem that the service network cannot include any CSG cellular stations (cells) of a home deployment type in the neighboring cell list in the measurement configuration message after receiving the proximity indication message from the mobile communications device as previously described, a measurement request procedure from a cellular station of a service network to a mobile communications device is further provided to allow the service network to include the CSG cellular stations of a home deployment type in the neighboring cell list and to transmit it to the mobile communications device for use in subsequent operations.

Figure 3:
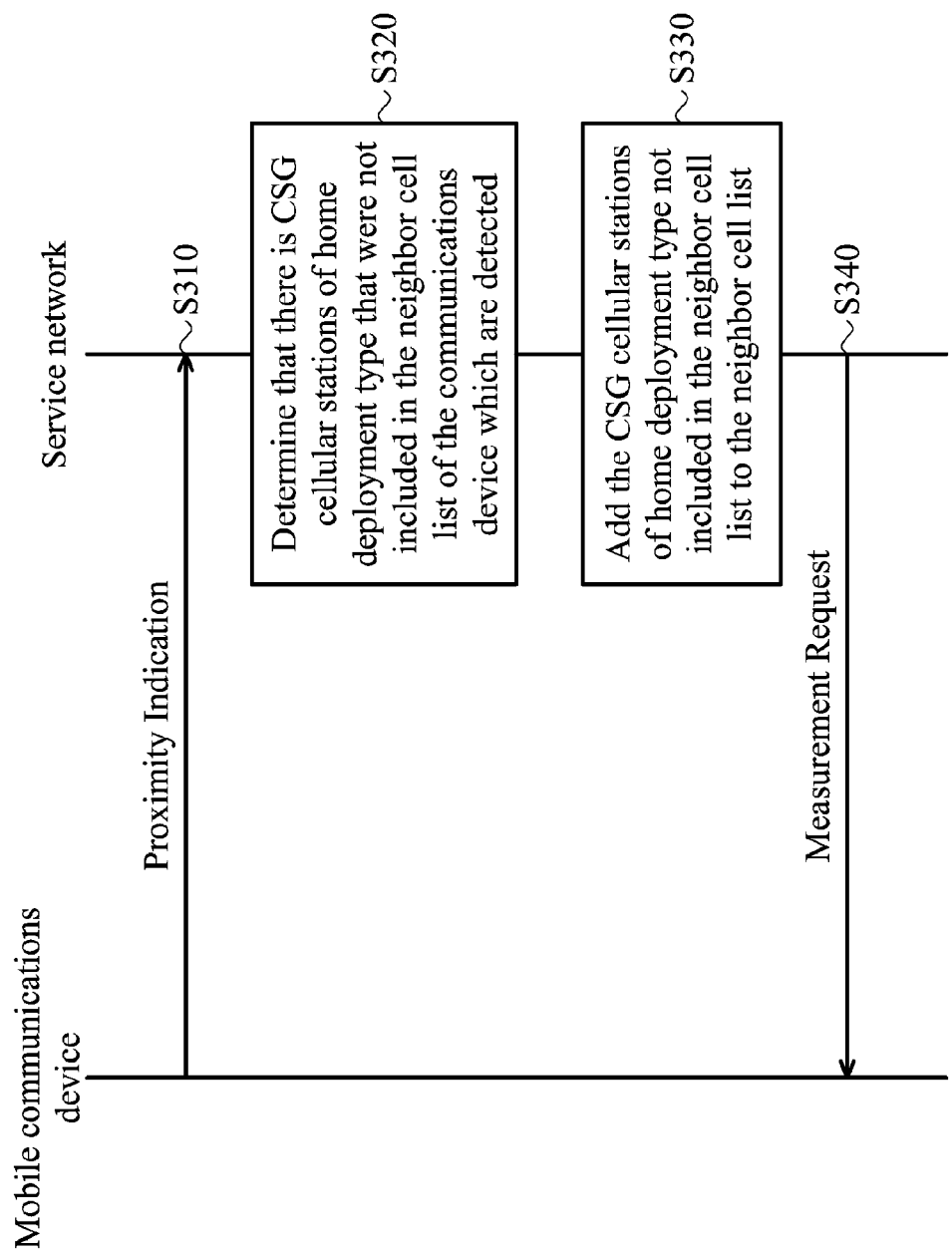
FIG. 3 is a message sequence chart illustrating a measurement request procedure from a cellular station to a mobile communications device according to another embodiment of the invention.

FIG. 3 is a message sequence chart illustrating a measurement request procedure from a cellular station to a mobile communications device according to another embodiment of the invention. Generally, the CSG cellular stations may be classified into two types of cellular stations, which are the CSG cellular stations of a home deployment type (i.e. the CSG cellular stations used in home (e.g. the HeNBs)) and the CSG cellular stations of a non-home deployment type (i.e. the CSG cellular stations used in a place other than home (e.g. in a supermarket or a department store). In this embodiment, the CSG cellular stations for a home deployment type are considered. Initially, the control node 124 may receive a proximity indication from the mobile communications device 110 via the cellular station 122 (step S310). The control node 124 may then prepare measurement configurations for the mobile communications device 110 to request the mobile communications device 110 to perform measurement reporting in response to the proximity indication. Thereafter, the control node 124 determines whether there is any CSG cellular stations of a home deployment type that were not included in the neighboring cell list of the communications device 110 which are detected (step S320). Note that the neighboring cell list includes cell information about neighboring cells, such as their cell IDs. The control node 124 may search for whether any cell IDs for the CSG cellular stations of a home deployment type can be found in the neighboring cell list and determine that there is CSG cellular stations of a home deployment type that are not included in the neighboring cell list of the communications device 110 that has been detected when no match is found.

In this embodiment, it is determined that the CSG cellular stations of a home deployment type that are not included in the neighboring cell list have been detected, so the control node 124 may then add the CSG cellular stations of the home deployment type not included in the neighboring cell list to the neighboring cell list (step S330).

The service network 120 may further include the updated neighboring cell list in the measurement object(s) to configure or request the mobile communications device 110 to measure and report on the newly added CSG cellular stations of the home deployment type. For example, the aforementioned CSG cellular stations of the home deployment type may be URTA cellular stations. In some embodiments, the CSG cellular stations of the home deployment type are to be included in the neighboring cell list by the control node 124 after the service network 120 has received a specific message from the mobile communications device 110. For example, the specific message may be, for example, the proximity indication message, or a dedicated message sent from the mobile communications device 110 to ask the service network 120 to direct the mobile communications device 110 to configure the aforementioned CSG cellular stations of the home deployment type, e.g. a specific measurement configuration message. In one embodiment, the mobile communications device 110 may transmit the specific message to the service network 120 upon, for example, detection of nearby or in the coverage of certain cellular stations. In another embodiment, the mobile communications device 110 may transmit the specific message to the service network 120 upon reception of a request from the upper layers software, which may be triggered by a user of the mobile communications device 110 whom has manually inputted a specific cellular station, requesting that it be searched for.

In one embodiment, the aforementioned certain cellular stations may be cellular stations that the mobile communications device 110 has visited before, e.g., for example, but not limited to, the prior serving cell of the mobile communications device 110, the cellular stations that the mobile communications device 110 has camped on before, the cellular stations that the mobile communications device 110 has measured before, the cellular stations that the mobile communications device 110 has been configured to measure before, the cellular stations stored in the USIM of the mobile communications device 110 and the cellular stations stored in the finger print list of the mobile communications device 110. In another embodiment, the aforementioned certain cellular stations may be cellular stations that are already stored in the memory of the mobile communications device 110, for example, but not limited to, cellular stations which were previously configured by the service network 120, and never found, cellular stations that are stored in the USIM of the mobile communications device 110, and cellular stations that are stored in the software or hardware of the mobile communications device 110. In another embodiment, the aforementioned cellular stations may be cellular stations that were manually inputted by a user of the mobile communications device 110, e.g. a specific cellular station that the user has inputted and requested to search for.

After the neighboring cell list has been updated, the control node 124 may then transmit a measurement request with the updated neighboring cell list to the mobile communications device 110 via the cellular station 122 (step S340), which requests a measurement to be performed on the cellular stations in the updated neighboring cell list. Accordingly, when receiving the measurement request, the controller module 114 may perform a measurement on the cellular stations in the updated neighboring cell list including the CSG cellular stations of a home deployment type via the wireless module 112. After the measurement is finished, the controller module 114 further reports the measurement result to the service network 120 via the wireless module 112. In this way, the CSG cells of a home deployment type may also be measured by the mobile communications device 110 and thus the mobile communications device 110 can be later handed over to the CSG cells of a home deployment type.

Figure 4:
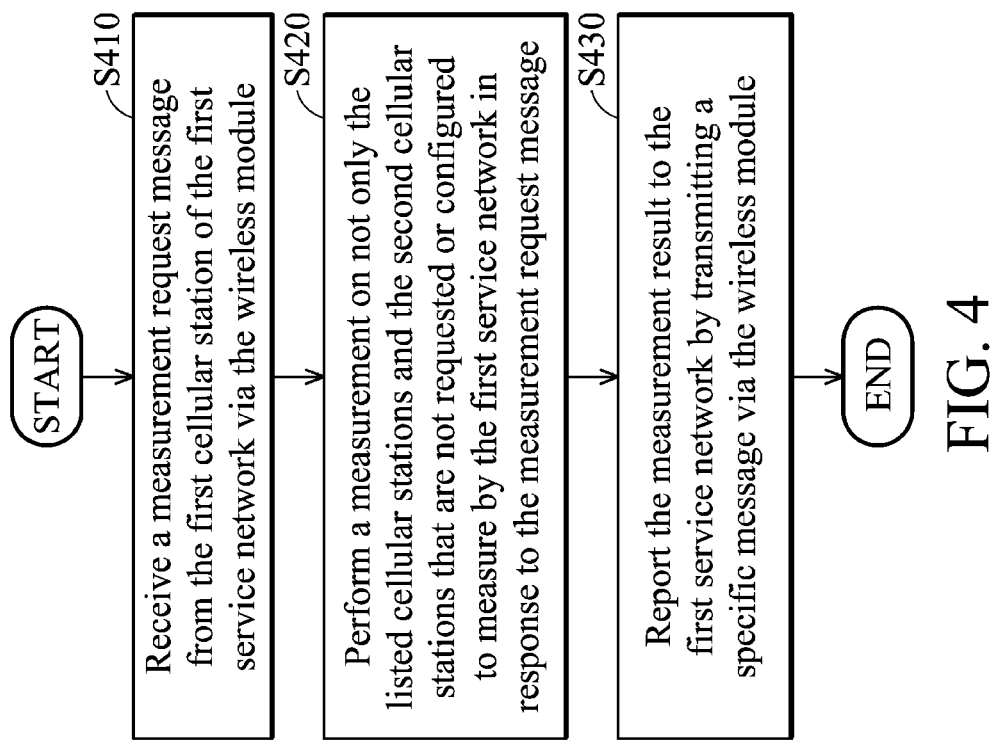
FIG. 4 is a flow chart illustrating a method for performing a measurement reporting procedure in a mobile communications device according to an embodiment of the invention.

FIG. 4 is a flow chart illustrating a method for performing a measurement reporting procedure in a mobile communications device according to an embodiment of the invention. In this embodiment, the mobile communications device is camped on a first cellular station of the first service network and is also capable of camping on a second cellular station of a second service network, wherein the first service network supports the long term evolution (LTE) technology and the second service network supports the Universal Terrestrial Radio Access (UTRA) technology. To begin, the mobile communications device receives a measurement request message from the first cellular station of the first service network (step S410). The measurement request message may include a list of cell identities of cellular stations that have been requested or configured to be measured. Next, the mobile communications device finds that some of the second cellular stations of the second service network which were not configured or requested to be measured by the first service network, e.g. the cellular stations that are not listed cellular stations within the measurement object(s) in the measurement request message but can be detected on the carrier frequency(ies) indicated by the measurement object(s), are present. The second cellular stations of the service network 130 can be referred to as detected cellular stations. In some embodiments, the detected cellular stations are CSG cellular stations. Particularly, the CSG cellular stations are home deployment types. For example, the aforementioned CSG cellular stations are the CSG cellular stations included in the CSG White list of the mobile communications device 110. As previously described, the aforementioned detected cellular stations may be, for example, cellular stations that the mobile communications device 110 has visited before, cellular stations that are already stored in the memory of the mobile communications device 110 or cellular stations that were manually inputted by a user of the mobile communications device 110, but it is not limited thereto.

Thereafter, the mobile communications device performs a measurement on not only the listed cellular stations and the second cellular stations that are not requested to be measured or configured by the first service network (e.g. the detected cellular stations) in response to the measurement request message (step S420), and after the measurement is finished, reports the measurement result to the service network 120 by transmitting a specific message (step S430), wherein the reported measurement result includes the measurement information related to the aforementioned detected cellular stations.

In this way, the mobile communications device 110 measures and reports not only the UTRA cells that have been requested or configured to be measured by the service network 120 but also the UTRA cells that have not been requested to be measured or configured by the service network 120 so that the service network may perform handover between the listed and detected cells.

Figure 5:
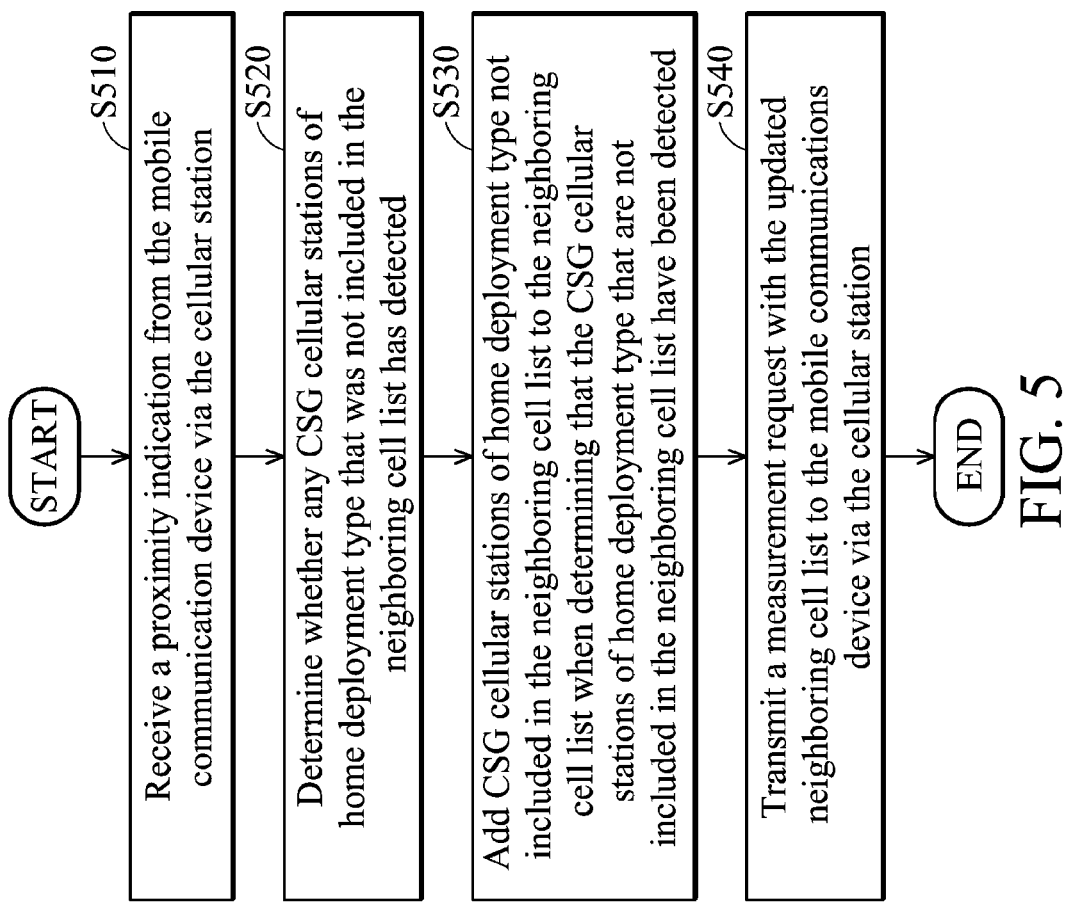
FIG. 5 is a flow chart illustrating a method for a service network to update a neighboring cell list of a mobile communications device according to an embodiment of the invention.

As previously described, in some embodiments, after receiving the specific message (e.g. the measurement report message), the service network 120 may retrieve the measurement results from the specific message and find that there are measurement information related to some cellular stations which are not being requested to be measured for the mobile communications device 110, so the service network 120 may further ask the mobile communications device to report additional information that is related to those cellular stations, for example, by transmitting a specific message (e.g. the RRC connection reconfiguration message) to the mobile communications device 110. The additional information that is related to the aforementioned detected cellular stations may comprise, for example, but not limited to, the CSG information, Cell Global Identity (CGI) information and/or the cell identity of each of the detected cellular stations. The CSG information may be information comprising CSG identity and/or an indication of whether the mobile communications device 110 is a CSG member. In some embodiments, the additional information may be system information of the aforementioned detected cellular stations that the mobile communications device 110 has already received before. FIG. 5 is a flow chart illustrating a method for a service network to update a neighboring cell list of a mobile communications device according to an embodiment of the invention. In this embodiment, the mobile communications device is camped on a CSG cellular station of the service network, wherein the CSG cellular station maintains a neighboring cell list of the mobile communications device, which indicates cell information about neighboring cells, such as their cell IDs.

To begin, the service network receives a proximity indication from the mobile communications device via the cellular station (step S510) and accordingly determines whether there is any CSG cellular stations of a home deployment type that was not included in the neighboring cell list of the communications device 110 has detected (step S520). The service network may search for whether any cell IDs for the CSG cellular stations of a home deployment type can be found in the neighboring cell list and determine that there is CSG cellular stations of a home deployment type that are not included in the neighboring cell list of the communications device 110 has detected when no match found. If it is determined that CSG cellular stations of a home deployment type that are not included in the neighboring cell list have been detected, the service network adds the CSG cellular stations of a home deployment type not included in the neighboring cell list to the neighboring cell list (step S530). The service network may include the updated neighboring cell list in the measurement object(s). The aforementioned CSG cellular stations of a home deployment type may be URTA cellular stations. In some embodiments, the CSG cellular stations of a home deployment type are to be included in the neighboring cell list after it has received a specific message from the mobile communications device, wherein the specific message may be the proximity indication message, or a dedicated message sent from the mobile communications device to ask the service network to direct the mobile communications device for configuration of the aforementioned CSG cellular stations of a home deployment type, e.g. a specific measurement configuration message. In one embodiment, the mobile communications device may transmit the specific message to the service network upon, for example, detection of nearby or in the coverage of certain cellular stations, or upon reception of a request from the upper layers, which may be triggered by a user of the mobile communications device 110 manually inputted a specific cellular station that is requested to be searched. As previously described, the aforementioned certain cellular stations may be cellular stations that the mobile communications device 110 has visited before, cellular stations that are already stored in the memory of the mobile communications device 110 or cellular stations that were manually inputted by a user of the mobile communications device 110, but it is not limited thereto.

After the neighboring cell list has been updated, the service network then transmits a measurement request with the updated neighboring cell list to the mobile communications device via the cellular station (step S540), which requests a measurement to be performed on the cellular stations in the updated neighboring cell list. When receiving the measurement request, the mobile communications device may then perform a measurement on the cellular stations in the updated neighboring cell list including the CSG cellular stations of the home deployment type and after the measurement is finished, the mobile communications device may report the measurement result to the service network. In this way, the CSG cells of a home deployment type can also be measured by the mobile communications device and thus the mobile communications device can be later handed over to the CSG cells of a home deployment type.

It is to be understood that, in this embodiment, although a proximity indication is first received from the mobile communications device to determine whether there is any CSG cellular stations of a home deployment type that is not included in the neighboring cell list has detected so as to add the CSG cellular stations of a home deployment type not included in the neighboring cell list to the neighboring cell list, but the invention is not limited thereto. The proximity indication procedure is only an optional procedure in this invention. In some embodiments, the method for a service network to update a neighboring cell list of a mobile communications device of the invention can still be applied to add the CSG cellular stations of a home deployment type not included in the neighboring cell list to the neighboring cell list even if the service network does not enable the proximity indication procedure. Furthermore, the mobile communications device may send the measurement report after or before the proximity indication.

The method of the measurement reporting may be implemented in program code stored in a machine-readable storage medium, such as a magnetic tape, semiconductor, magnetic disk, optical disc (e.g., CD-ROM, DVD-ROM, etc.), or others, and when loaded and executed by a processing unit, a micro-control unit (MCU), or the controller module 114 in FIG. 1, the program code may perform the method of the measurement reporting. In addition, the method may be applied to any mobile communications device supporting the WCDMA technology and/or the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A mobile communications device, comprising:
a wireless module performing wireless transceiving to and from a first cellular station of a first service network and a second cellular station of a second service network, wherein the first service network is a long term evolution (LTE) network and the second service network is a Universal Mobile Telecommunications System (UMTS) network; and a controller module receiving a measurement request message from the first cellular station via the wireless module, performing a measurement on the second cellular station in response to the measurement request message and reporting the measurement result to the first service network via the wireless module, wherein the second cellular station is previously not requested or configured by the first service network to be measured, wherein the controller module comprises a list of cellular stations provided by the first service network to be measured on dedicated carrier frequencies, and the second cellular station is a detected cellular station that is not listed in the list of cellular stations and is detectable on the dedicated carrier frequencies by the controller module.

2. The mobile communications device of claim 1, wherein the detected cellular station is a closed subscriber group (CSG) cellular station.

3. The mobile communications device of claim 2, wherein the CSG cellular station is a home deployment type.

4. The mobile communications device of claim 3, wherein the CSG cellular station is in a CSG white list of the mobile communications device.

5. The mobile communications device of claim 1, wherein the second cellular station is visited by the mobile communications device previously or stored in a memory of the mobile communications device.

6. The mobile communications device of claim 1, wherein the second cellular station is a cellular station that is manually inputted by a user.

7. The mobile communications device of claim 1, wherein the controller module reports the measurement result by sending a specific message to the first service network.

8. The mobile communications device of claim 7, wherein the specific message comprises a measurement report message.

9. The mobile communications device of claim 7, wherein the controller module further receives a first message for requesting to report an additional information from the first service network via the wireless module after the specific message is received by the first service network.

10. The mobile communications device of claim 9, wherein the first message comprises a radio resource control (RRC) connection reconfiguration message.

11. The mobile communications device of claim 9, wherein the controller module further transmits a second message to report the additional information to the first service network via the wireless module after receiving the first message.

12. The mobile communications device of claim 11, wherein the second message comprises at least one of a proximity indication message, a RRC connection reconfiguration complete message and a dedicated message for reporting a CSG information.

13. The mobile communications device of claim 1, wherein the measurement request message comprises a system information or a RRC connection reconfiguration message.

14. A method for measurement reporting in a mobile communications device, comprising:
receiving a measurement request message from a first cellular station of a first service network;
performing a measurement on a second cellular station of a second service network in response to the measurement request message, wherein the first service network is a long term evolution (LTE) network and the second service network is a Universal Mobile Telecommunications System (UMTS) network, and the second cellular station is previously not requested or configured by the first service network to be measured; and
reporting the measurement result to the first service network,
wherein a list of cellular stations are provided by the first service network to be measured on dedicated carrier frequencies, and the second cellular station is a detected cellular station that is not listed in the list of cellular stations and is detectable on the dedicated carrier frequencies by the controller module.

15. The method of claim 14, further comprising reporting the measurement result by sending a specific message to the first service network.

16. The method of claim 15, wherein the specific message comprises a measurement report message.

* * * * *